United States Patent [19]

Oyanagi et al.

[11] Patent Number: 4,982,340
[45] Date of Patent: Jan. 1, 1991

[54] PLURAL PROCESSOR INFERENCING SYSTEM AND METHOD

[75] Inventors: Shigeru Oyanagi; Sumikazu Fujita, both of Yokohama; Sadao Nakamura, Yamato; Takashi Suzuoka, Yokohama, all of Japan

[73] Assignee: Kabushiki Kaisha Toshiba, Kawasaki, Japan

[21] Appl. No.: 212,490

[22] Filed: Jun. 28, 1988

[30] Foreign Application Priority Data

Jun. 30, 1987 [JP] Japan ................................ 62-163071

[51] Int. Cl.$^5$ ............................................. G06F 15/18
[52] U.S. Cl. ..................................... 364/513; 364/133
[58] Field of Search ................ 364/513, 300, 200, 133

[56] References Cited

U.S. PATENT DOCUMENTS 4,815,005  3/1989  Oyanagi et al. ..................... 364/300

FOREIGN PATENT DOCUMENTS 0254825  2/1988  European Pat. Off. .
3619095  12/1987  Fed. Rep. of Germany .
WO87/01221  2/1987  World Int. Prop. O. .

OTHER PUBLICATIONS

National Computer Conference 1986; L. Bic; "Dataflow Architectures for Knowledge Representation Systems".
Proceedings of First Annual National Conference on Artificial Intelligence; S. E. Fahlman, "Design Sketch for a Million-Element Netl Machine"; Aug. 1980.

*Primary Examiner*—Allen MacDonald
*Attorney, Agent, or Firm*—Foley & Lardner, Schwartz, Jeffery, Schwaab, Mack, Blumenthal & Evans

[57]                ABSTRACT

An inference processing system comprises a plurality of processors assigned for nodes of a semantic network respectively to carry out parallel processing. Each of the processors stores tables and linking information. The tables are made by arranging rules and prepared for goals respectively. Each table contains the names of links to follow when a certain goal is given and markers for specifying the kinds of the links. In the table, the link names and markers are set as outputs with respect to the given goal as an input. The linking information contains information of links connected to a node for which a corresponding one of the processors is assigned. When the goal and a marker are inputted to any one of the processors, the processor finds an output marker and output links in the tables and linking information and outputs the output marker to the output links, thus achieving an inference process.

18 Claims, 8 Drawing Sheets

GOAL: grandfather

| LEFT | | RIGHT | |
|---|---|---|---|
| LINK NAME | MARKER | LINK NAME | MARKER |
| ✶ | | father | 1 |
| father$^{-1}$ | 1 | father | 2 |
| father$^{-1}$ | 2 | ✶ | |

FIG. 6

| NODE | PE1 | PE2 | PE3 | PE4 |
|---|---|---|---|---|
| LINKING INFORMATION | TARO<br>father:ICHIRO,JIRO (PE2),(PE3) | ICHIRO<br>father$^{-1}$: TARO (PE1)<br>father: SABURO,SHIRO (PE4),(PE5) | JIRO<br>father$^{-1}$:TARO (PE1)<br>father:GORO,ROKURO (PE6),(PE7) | SABURO<br>father$^{-1}$: |

FIG. 9

GOAL: ancestor

| LEFT | | RIGHT | |
|---|---|---|---|
| LINK NAME | MARKER | LINK NAME | MARKER |
| * | 1 | father | 1 |
| father$^{-1}$ | 1 | father | 1 |
| father$^{-1}$ | | * | |

PLURAL PROCESSOR INFERENCING SYSTEM AND METHOD

BACKGROUND OF THE INVENTION

1. Field of the Invention

The present invention relates to an inference processing system used for an expert system, etc., and particularly to an inference processing system using a plurality of processors to carry out a parallel inference operation.

2. Description of the Prior Art

Recently, studies are enthusiastically being done on expert systems that utilize computers to substitute for the roles of experts in various fields. The expert systems store knowledges of the experts in the computers and use the stored knowledges to infer conclusions.

As an example of the inference, a way of description by a Prolog which is one programming language suitable for the inference will be described.

A program written with the Prolog comprises facts and rules.

The facts are descriptions of relations between things. For instance, a fact "Taro is father of Ichiro" is described with a predicate "father" and arguments "Taro" and "Ichiro" as follows:

father (Taro, Ichiro).

The rules are the expressions of knowledges such as "if A then B". The rules are described by replacing the arguments "Taro" and "Ichiro" with variables "X" and "Z" for example as follows:

grandfather (X, Y):-
father (X, Z), father (Z, Y)

This rule means that "if X is father of Z and if Z is father of Y, then X is grandfather of Y".

Generally, an execution of the program written with the Prolog is ended when a given goal is matched (unified) with certain facts. Even if the given goal and the facts are not unified at first, the given goal is unified with respect to the left side of a rule. When the goal is unified with the left side of the rule, the right side of the rule will be set as a new goad that is to be again unified with respect to the left side of the rule. This operation is repeated. When the goal is unified with respect to the facts, the execution of the program is ended.

| Rule 1: | grandfather (X, Y):- |
| | father (X, Z), father (Z, Y) |
| Fact 1: | father (Taro, Ichiro) |
| Fact 2: | father (Taro, Jiro) |
| Fact 3: | father (Ichiro, Saburo) |
| Fact 4: | father (Ichiro, Shiro) |
| Fact 5: | father (Jiro, Goro) |
| Fact 6: | father (Jiro, Rokuro) |

If a goal "grandfather (Taro, Y)" that means "whose grandfather Taro is" is given, the goal is unified collated with the left side of the rule 1 to get X=Taro. This is substituted for the right side of the rule 1 to present a new goal "father (Taro, Z), father (Z, Y)". The front half "father (Taro, Z)" of this new goal and the rule 1 are unified to find Z=Ichiro. This is substituted for the new goal to obtain "father (Taro, Ichiro), father (Ichiro, Z)". Then, the rear half "father (Ichiro, Y)" of the new goal and the fact 3 are unified to obtain Y=Saburo. As a result, one solution "grandfather (Taro, Saburo)" is obtained.

The above-mentioned process is a way to obtain the one solution. To obtain all solutions satisfying the first goal "grandfather (Taro, Y)", a back tracking operation shall further be carried out. Namely, the substitution of "Y=Saburo" obtained in the above-mentioned process is canceled to find another solution that is unified with respect to the middle goal "father (Ichiro, Y)". Then, this goal and the fact 4 are unified to obtain a new solution of Y=Shiro. In this way, the substitutions for the variables are successively canceled to find other solutions, i.e., Y=Goro and Y=Rokuro.

The facts used in this example may be expressed with a semantic network shown in FIG. 1. In the semantic network, the arguments of predicates are expressed as nodes of the network respectively, and the predicates indicating relations between the arguments are represented with links between the nodes. In FIG. 1, the rule 1 is translated that a grandfather link is equivalent to two stages of father links.

To search all solutions for a goal according to the above-mentioned back tracking, the substitution and back tracking shall be frequently repeated on the respective links of the semantic network. Therefore: a time needed for executing the Prolog program is extended to hinder high-speed processing.

As described in the above, the conventional inference system searches all solutions to a goal through sequential processing where the substitution and back tracking are repeated frequently to increase an amount of knowledges to be handled and extremely elongate an execution time of the program.

SUMMARY OF THE INVENTION

An object of the present invention is to provide an inference processing method and system comprising a plurality of processors that will carry out parallel inference processes on a semantic network at a high speed.

Another object of the present invention is to provide an inference processing system and method that can carry out an inference operation for finding all solutions to a goal in a short execution time of program.

In order to accomplish the objects and advantages mentioned in the above, the present invention provides an inference processing system comprising a plurality of processors assigned for nodes of a semantic network respectively to carry out parallel processing. Each of the processors stores tables and linking information to be explained hereunder.

The tables are made by arranging rules and prepared for goals respectively. Each table contains the names of links to follow when a certain goal is given and markers for specifying the kinds of the links. In the table, the link names and markers are set as outputs with respect to the given goal as an input.

The linking information contains information of links connected to a node for which a corresponding one of the processors is assigned.

When a goal and a marker are inputted to any one of the processors, the processor finds an output marker and output links in the tables and linking information and outputs the output marker to the output links, thus achieving an inference process.

Each of the processors starts its operation as soon as it receives a message sent from a host computer or any other processor. The processor finds a goal out of the message and selects a table corresponding to the goal among the tables. If the received message includes a marker, the marker may tell which part of the table the processor shall refer to. Then the processor picks up an output marker or a solution in the table and outputs the output marker or the solution to links specified according to the table and linking information.

Namely, after receiving the message, each processor starts to operate in parallel with the other processors according to the internal tables and information, so that a high-speed search is realized even when all solutions shall be searched. By properly reversing the relations of the inputs and outputs of each table stored in every processor, two-way processing may be realized.

These and other objects, features and advantages of the present invention will become apparent from the following descriptions of preferred embodiments taken in conjunction with the accompanying drawings

BRIEF DESCRIPTION OF THE DRAWINGS

FIG. 6 is a view showing linking information stored in each of the processors of the system shown in FIG. 4;

FIG. 9 is a view showing another example of a table stored in each of the processors.

DETAILED DESCRIPTION OF THE PREFERRED EMBODIMENTS

Figure 4:
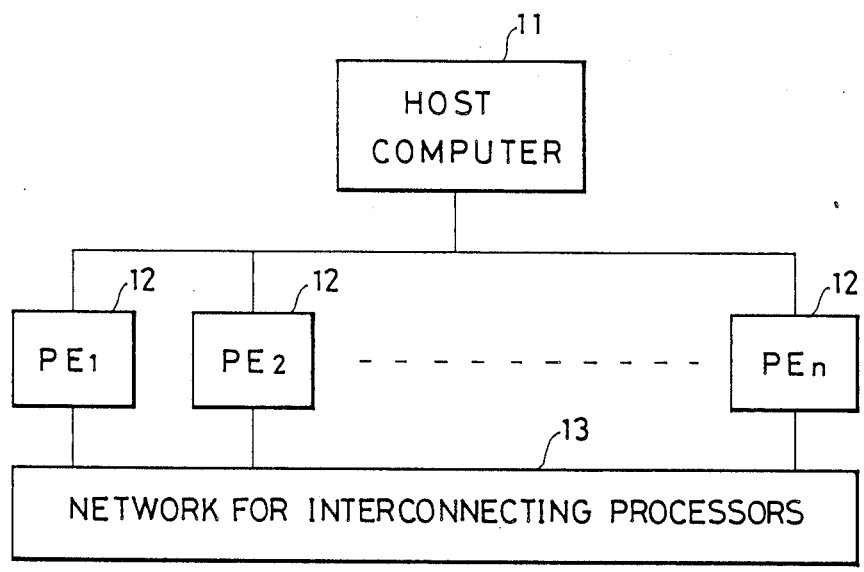
FIG. 4 is a block diagram showing the inference processing system according to an embodiment of the present invention.

With reference to FIG. 4, an inference processing system according to an embodiment of the present invention will be explained.

The inference processing system comprises a host computer 11, a plurality of processors 12 connected to the host computer 11, and a processor interconnecting network 13. In this system, information is exchanged between the host computer 11 and the processors 12 as well as between the processors 12, and the processors 12 are operated in parallel to each other.

Figure 1:
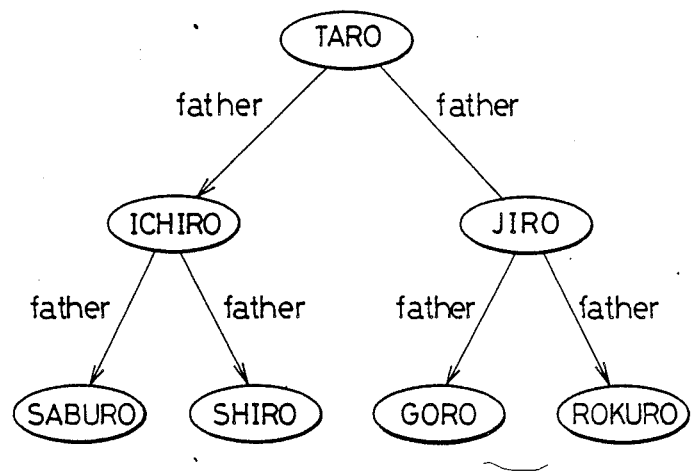
FIG. 1 is a view showing an example of a semantic network for carrying out an inference operation.
Figure 2:
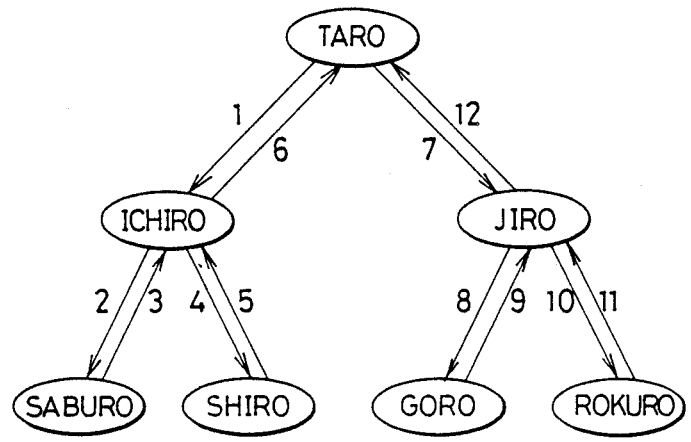
FIG. 2 is a view for explaining steps for searching all solutions to a goal on the semantic network shown in FIG. 1, according to a conventional sequential process.
Figures 3, 5:
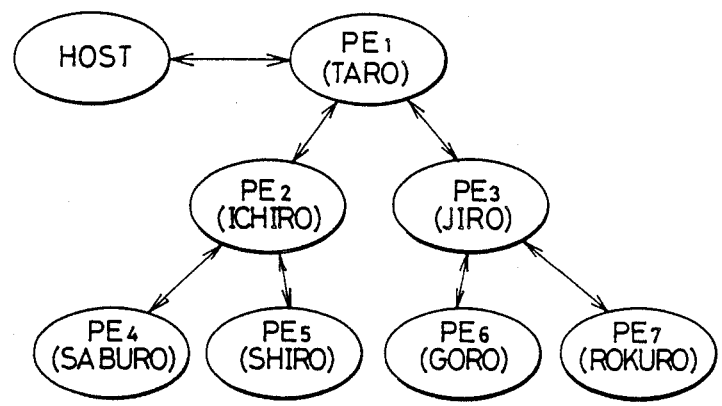
FIG. 3 is a view showing the constitution of an inference processing system according to an embodiment of the present invention where processors are assigned to nodes of the semantic network; respectively.
FIG. 5 is a view showing a table stored in each of the processors of the system shown in FIG. 4.

FIG. 3 is a view showing an example of the arrangement of the processors 12 on the semantic network shown in FIG. 1. The processors 12 are assigned to the nodes of the semantic network respectively, and each link of the semantic network comprises a two-way connecting passage.

Each processor 12 is provided with stored tables, one example shown in FIG. 5, and stored linking information shown in FIG. 6.

The table of FIG. 5 is made by arranging rules according to the Prolog, and shows what kind of operation the processor shall carry out in response to an input message. The table shown in FIG. 5 is for a goal "grandfather". With respect to this goal, a left column of the table contains input link names and input markers while a right column contains output link names and output markers. A mark "*" for the link name indicates that a receiving or a transmitting operation is carried out with respect to an original sender. For example, a first line of the left column of the table shows "*" as an input link name so that, when the processor 12 storing this table receives a message from the host computer 11, the processor 12 transmits a marker "1" along links "father" because the first line of the table indicates the output link name "father" and output marker "1". The second line of the table indicates that, if the processor receives a marker "1" from an input link "father$^{-1}$", it transmits a marker "2" along links "father".

In this table, by setting the right column as an input and the left column as an output, a search opposite to the above-mentioned search will be realized. For example, a goal "grandfather$^{-1}$" may be processed by reversely translating the left and right columns of the table shown in FIG. 5 that has been originally prepared for the goal "grandfather". Accordingly, without increasing a storage capacity, a two-way search between the nodes will be realized.

FIG. 6 shows the linking information stored in the respective processors 12. For example, the processor 12 (PE1) assigned to the node Taro stores the linking information of "father: Ichiro, Jiro".

The operation of the processors 12 will be described.

Figure 7:
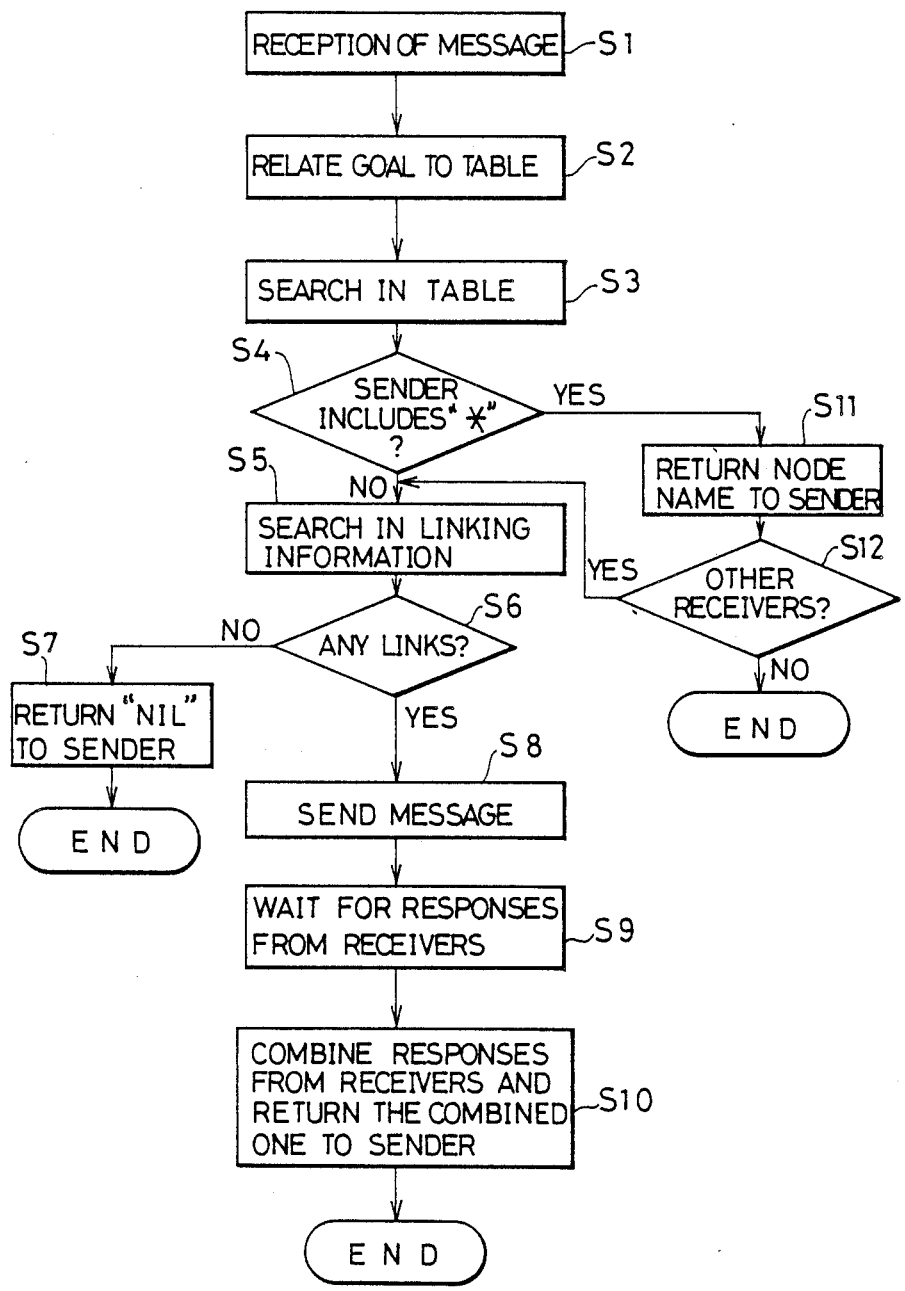
FIG. 7 is a flowchart showing an operation of each processor.

FIG. 7 is a flowchart showing the operation of each of the processors 12. Each processor 12 starts to operate when it receives a message from the host computer 11 or from the other processor 12 (step S1). The received message includes a goal and a marker. According to the goal, the processor selects a table among the tables stored in the processor and decides its direction to refer (step S2). The processor searches in the table for a line corresponding to the input link name and input marker to decide an output link name and an output marker (step S3). If the output link name is not "*" (step S4), the processor checks to see whether or not there is an output link according to the linking information (step S5). If there is no output link, the processor sends "nil" back to a sender (steps S6 and S7) to finish the process (step 8). If there is the output link, the processor sends a message to a receiver specified by the linking information (steps S6 and S8). After sending the message, the processor waits for a response from the receiver (if the receiver reaches to a solution, the response will be a node name and, if the receiver does not reach to the solution, the response will be "nil") (step S9). If the processor receives the response, the processor sends the same back to the sender (step S10). At this time, if there come responses from a plurality of receivers, the processor combines the responses together and sends the combination back to the sender (step S10).

In this way, each processor 12 starts to operate when it receives a message, and refers to its own tables to a synchronously carry out its own process so that efficient parallel processing may be realized, and all solutions will be obtained in a short time.

FIG. 8 is a view showing a flow of messages between the processors in searching solutions of "grandfather (Taro, X)" according to the above-mentioned process.

Figure 8A:
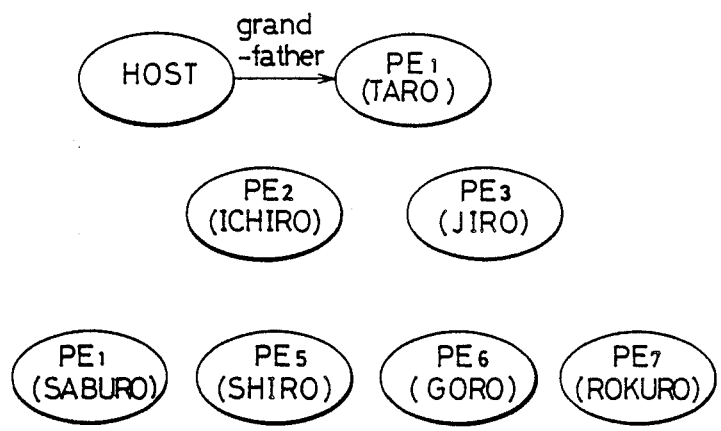
FIGS. 8a to 8f are views explaining a flow of data in the system shown in FIG. 4.
Figure 8B:
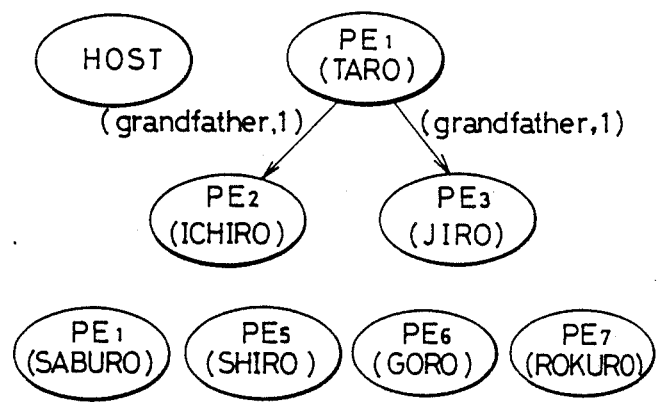

Firstly, as shown in FIG. 8a, the host computer 11 sends a goal "grandfather" to the processor (PE1) assigned for the node "Taro". The processor (PE1) searches in its own table (FIG. 5) set for the goal "grandfather". Since the message was given by the host computer 11, the processor (PE1) selects a first line of the table where an input link name is "*". Since an output link name is "father" and an output marker "1" in the first line of the table, the processor (PE1) sends the goal and the marker "1" to processors (PE2, PE3) that are specified according to the linking information (FIG. 6), as shown in FIG. 8b. The processor (PE1) waits for responses from the processors (PE2, PE3).

The processors (PE2, PE3) search their tables (FIG. 5) and, since the marker "1" was inputted from the link "father,−1", each of the processors selects the second line of the table where an output link name is "father" and an output marker "2".

Figure 8C:
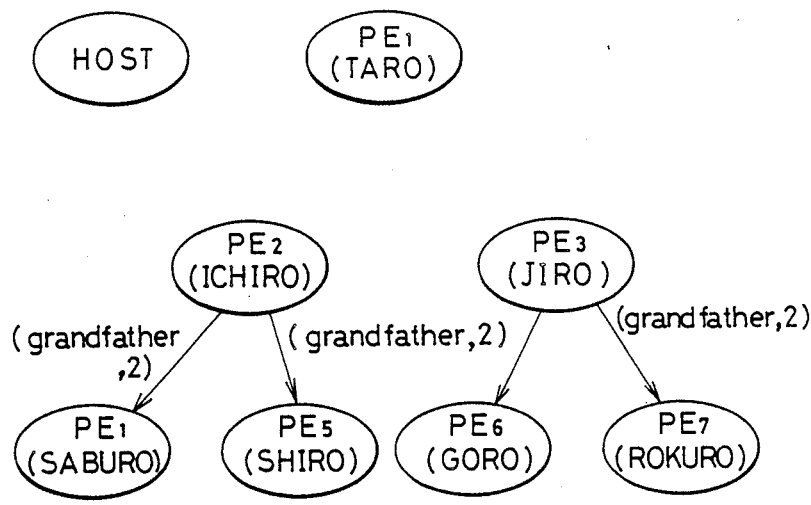

Then, as shown in FIG. 8c, the processors (PE2, PE3) send the goal and marker "2" to the processors (PE4 for the node Saburo, PE5 for Shiro, PE6 for Goro, PE7 for Rokuro) according to the linking information shown in FIG. 6.

Figure 8D:
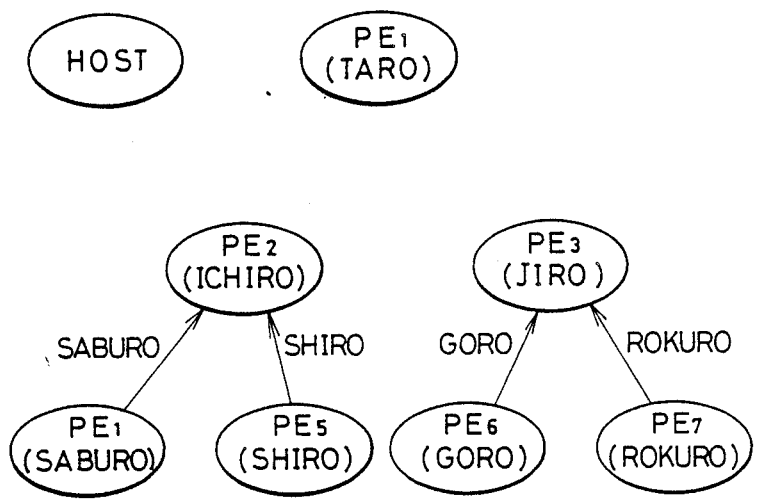

Similarly, each of the processors (PE4 to PE7) selects a third line of the table shown in FIG. 5 where an output link name is "*", and therefore sends its own node name to the senders (PE2, PE3) notice that it has reached to a solution, thus completing the process (FIG. 8d).

Figure 8E:
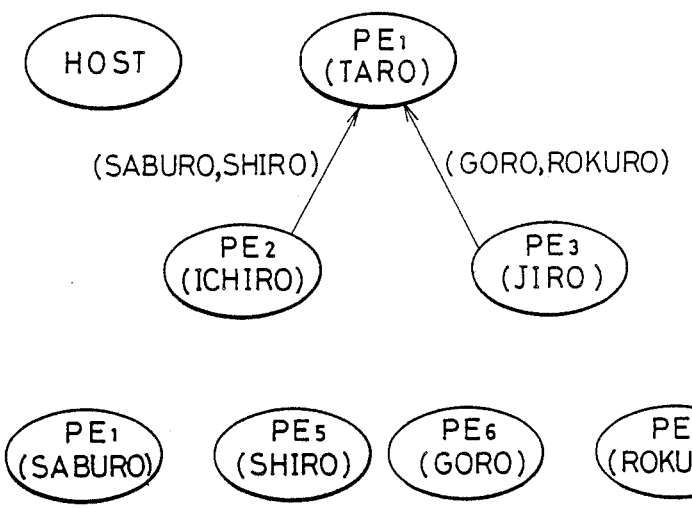

After receiving the response messages from the processors (PE4 to PE7), the processors (PE2, PE3) combine the response messages respectively and send the combined messages back to the receiver (PE1) that has originally received the goal message to complete their processes (FIG. 8e).

Figure 8F:
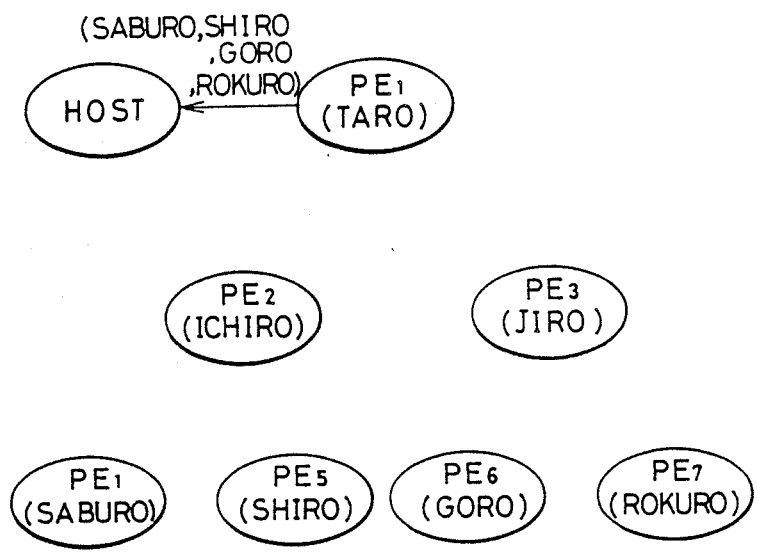

After receiving the responses from the processors (PE2, PE3), the processor (PE1) combines the responses to send the combined message back to the host computer 11 to complete its process (FIG. 8f).

The inference processing system mentioned in the above may be called as a data driven type parallel processing system because the respective processors of the system start to operate according to the reception of messages.

Contrary to the example mentioned in the above, an X satisfying "grandfather (X, Saburo)" will be found by sending a goal "grandfather−1" from the host computer 11 to the processor (PE4) assigned for the node Saburo. The respective processors inversely use the left and right columns of their tables to carry out the similar processes.

According to the system of the present invention, higher inference processing may be realized by using different tables.

For example, the Prolog language describes the relations of ancestors (descendants) in two lines as follows:

| | |
|---|---|
| ancestor (X, Y): | father (X, Y) |
| ancestor (X, Y): | father (X, Z), |
| | ancestor (Z, Y) |

This is a recursive description where a section of a main portion includes the same section as that of a head portion. According to the system of the present invention, this rule is simply arranged in a table as shown in FIG. 9. In this table, a processor that receives a marker "1" through a link "father−1" matches to both the second and third lines of the table so that the processor will be a solution by itself and its descendants will also be solutions. Therefore, the processor sends its own node while sends an output marker "1" to receivers along links "father". These processes correspond to steps S11 and S12 shown in FIG. 7.

According to the present invention, it is possible to write a plurality of unions and intersections in a single line of a table, thereby describing in the table rules including branches. Accordingly, the higher inference processing will be realized.

Although the inference rules have been arranged in tables in the embodiment, it is naturally possible to arrange the rules in other forms equivalent to the tables.

In summary, the present invention utilizes tables arranged according to rules and linking information to carry out an inference operation with a plurality of processors operated in parallel and in two ways on a semantic network, so that the inference operation may be carried out at a high speed.

Various modifications will become possible for those skilled in the art after receiving the teachings of the present disclosure without departing from the scope thereof.

What is claimed is:

1. An inference processing system for finding solutions to a goal given by an external unit by matching the goal with certain facts expressed in the form of a semantic network composed of nodes and links that connect the nodes to each other, comprising:

a plurality of processors provided for the nodes of the semantic network respectively, each of said processors having means for storing tables prepared for respective goals to be given and for storing linking information related to links connected to a corresponding one of the nodes, each of the tables storing names of output links to follow when at least a goal corresponding to the table is inputted thereto as well as output markers for specifying kinds of the output links; and connecting means for connecting said processors to each other according to the links of the semantic network, each of said processors including means for specifying, when a goal and a marker are inputted thereto from the other of said processors through said connecting means, an output link name and an output marker in the tables and for specifying linking information according to the inputted goal and marker, and for sensing the goal and specified output marker to links having the specified output link name, thereby carrying out parallel inference processing.

2. The inference processing system as claimed in claim 1, wherein each of said processors includes means for specifying an output link name and an output marker in the table and for specifying linking information according to the inputted goal when only a goal is inputted from said external unit, and including means for sending the goal and the specified output marker to links having the specified output link name.

3. The inference processing system as claimed in claim 1, wherein the tables stored in each of said processors are specified respectively by the goals to be given thereto, and each of the tables holds the names of input links and input markers to be referred when a goal and a marker are given to the table and holds the names of output links and output markers to be outputted corresponding to the input link names and input markers.

4. The inference processing system as claimed in claim 1, wherein each of said processors includes means for storing tables prepared for respective goals to be given thereto, each of the tables holding the names of output links to follow when at least a goal corresponding to the table is inputted thereto as well as output markers for specifying the positions of the output links to follow with respect to solutions.

5. The inference processing system as claimed in claim 1, wherein said connecting means comprise two-way connecting passages for connecting the processors in parallel.

6. The inference processing system as claimed in claim 1, wherein the linking information stored in each of said processors indicates all the links connected to a node for which a corresponding one of said processors is assigned.

7. The inference processing system as claimed in claim 1, wherein the external unit comprises a host computer.

8. The inference processing system as claimed in claim 1, wherein each of the tables stored in each of said processors includes a set of link names and markers for input and a set of link names and markers for output, the set for input and the set for output of the link names and markers being able to be inverted to realize two-way characteristics.

9. An inference processing system for finding solutions to a goal given by an external unit by matching the goal with certain facts expressed in the form of a semantic network composed of nodes and links that connect the nodes to each other, comprising:
   a plurality of processors provided for the node of the semantic network respectively, each of said processors having storage means for storing tables which are identifiable with a goal or a marker from the other of said processors given thereto which include means for storing linking information related to links connected to a corresponding one of the nodes, each of the storage means storing input link names or input markers as well as storing output link names or output markers corresponding to the input link names or the input markers; and
   connecting means for connecting sid processors to each other according to the links of the semantic network,
   each of said processors having means for specifying, when a goal and a marker are inputted thereto from the other of said processors through said connecting means, an output link name and an output marker in the tables and for specifying linking information according to the inputted goal and marker, and for sending the goal and specified output marker to links having the specified output link name, each of said processors further including means for specifying, when only a goal is inputted thereto from the external unit, an output link name and an output marker in the tables and for outputting the goal and the specified output marker to links having the specified output link name.

10. The inference processing system as claimed in claim 9, wherein said connecting means comprise two-way connecting passages for connecting the processors in parallel.

11. The inference processing system as claimed in claim 9, wherein the linking information stored in each of said processors indicates all the links connected to a node for which a corresponding one of said processors is assigned.

12. The inference processing system as claimed in claim 9, wherein the external unit comprises a host computer.

13. An inference processing method for finding solutions to a goal given by an external unit by matching the goal with certain facts expressed in the form of a semantic network composed of nodes and links that connect the nodes to each other, said method comprising:
   storing, within each of a plurality of processors provided for the respective nodes of the semantic network, a table prepared for the respective goals to be given and linking information related to links connected to a corresponding one of the nodes, each of the tables storing names of output links to follow when at least a goal corresponding to the table is inputted thereto as well as output markers for specifying kinds of the output links;
   connecting said processors to each other according to the links of the semantic network;
   specifying, when a goal and marker are inputted to one of said processors form another of said processors, an output link name and an output marker in the tables and specifying linking information according to the inputted goal and marker; and then
   sending the goal and the specified output marker to links having the specified output link name, thereby carrying out parallel inference processing.

14. The inference processing method as claimed in claim 13, wherein, when only a goal is inputted into a processor from the external unit, an output link name and an output marker are specified in the corresponding table and linking information is specified according to the inputted goal, and the goal and the specified output marker are sent to links having the specified output link names.

15. The inference processing method as claimed in claim 13, wherein each of the tables are specified by the goals to be given thereto and each processor holds the names of input links and input markers to be referred to when a goal and a marker are given to the table and holds the names of output links and output markers to be outputted corresponding to the input links and the input markers.

16. The inference processing method as claimed in claim 13, wherein each of said processors stores tables prepared for respective goals to be given thereto, and each of the tables holds the names and output links to follow when at least a goal corresponding to the table is inputted thereto as well as output markers for specifying the positions of the output links to follow with respect to the solutions.

17. The inference processing method as claimed in claim 13, wherein the linking information stored in each processor indicates all the links connected to a node for which a corresponding one of said processors is assigned.

18. The inference processing method as claimed in claim 13, wherein each of the tables includes a set of link names and markers for input and a set of link names and markers for output, the markers being capable of being inverted to realize two-way characteristics.

* * * * *